United States Patent [19]

Sato et al.

[11] Patent Number: 4,737,557
[45] Date of Patent: Apr. 12, 1988

[54] 3-N-HIGHER ALKYLTHIOPHENE POLYMER AND COMPOSITION THEREOF

[75] Inventors: Masaaki Sato; Susumu Tanaka, both of Ibaraki; Kyoji Kaeriyama, Tsuchiurashi; Yoshio Suda, Hachioji, all of Japan

[73] Assignees: Agency of Industrial Science and Technology; Ministry of International Trade and Industry, both of Tokyo, Japan

[21] Appl. No.: 28,620

[22] Filed: Mar. 20, 1987

[51] Int. Cl.[4] .............................................. C08F 28/06
[52] U.S. Cl. .................................... 526/256; 252/500; 522/168; 524/127; 524/164; 524/401; 524/405; 524/415; 524/438; 528/380
[58] Field of Search ........................ 526/256; 528/380; 252/500; 522/168; 524/127, 164, 401, 405, 415, 438

[56] References Cited

U.S. PATENT DOCUMENTS

| 4,521,589 | 6/1985 | Yamamoto et al. | 528/380 |
| 4,691,005 | 9/1987 | Sato et al. | 528/380 |

Primary Examiner—Harold D. Anderson
Attorney, Agent, or Firm—Oblon, Fisher, Spivak, McClelland & Maier

[57] ABSTRACT

A 3-n-alkylthiophene polymer of the general formula:

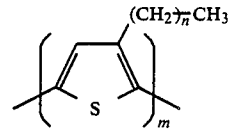

(wherein n stands for an integer in the range of 5 to 11 and m for an integer in the range of 80 to 350) and a composition containing this polymer.

3 Claims, 2 Drawing Sheets

3-N-HIGHER ALKYLTHIOPHENE POLYMER AND COMPOSITION THEREOF

FIELD OF THE INVENTION AND RELATED ART STATEMENT

This invention relates to a novel thiophene derivative polymer and a thiophene derivative polymer composition consisting, or mainly consisting of the aforementioned derivative polymer and an anion dopant. More specifically, this invention relates to a 3-n-alkylthiophene polymer and a 3-n-alkylthiophene polymer composition consisting, or mainly consisting of the aforementioned polymer and an anion dopant.

The polymer and polymer composition mentioned above are soluble in solvents, possess good moldability and highly satisfactory electric properties, and are suitable for the production of a wide variety of electric parts.

They can be easily produced from 3-n-alkylthiophene as a starting material by electrochemical methods.

As polymers of thiophene and thiophene derivatives, poly-(2,5-thienylene) [Makromol. Chem., Vol. 185, page 1295 (1984)] and poly-[2,5-(3-methylthienylene)] (Synth. Metal, Vol. 9, page 38 (1984)) which are obtained by electrolytically polymerizing thiophene or 3-methylthiophene and subsequently subjecting the polymer to electrolytic reduction have been known. These electrochemically produced polymers are obtained only with polymerization degrees falling in a specific range. Since they are insoluble in various solvents and are infusible, they are sparingly moldable and are impracticable as raw materials for production of parts.

A method for producing such polythiophene and a thiophene derivative polymer having a lower alkyl group substituted at 3-position of a thiophene unit as poly(2,5-thienylene) mentioned above by the debrominating polymerization of 2,5-dibromothiophene has been known from Bull. Chem. Soc. Japan, Vol. 56, 1503–1507 (1983) and U.S. Pat. No. 4,521,589. The polymers of a thiophene and thiophene derivatives having a lower alkyl group at the 3-position which are obtained by the method just described have polymerization degrees in the range of 20 to 100. These polymers are in the form of powder. To be effectively used in the production of various parts, therefore, they require various molding treatments. These polymers are partially soluble when their degrees of polymerization are not higher than about 30. In this case, the soluble part is about 5 w/w % of the product. Because of the low degrees of polymerization, however, the soluble part of the polymers, has inferior casting moldability and the products molded of such a polymer having the soluble part possess inferior mechanical properties.

The polymer compositions consisting of a polymer and a dopant have electric conductivity of less than 1 S/cm and, therefore, are not practicable as materials for organic conductive materials or other similar materials.

Although various techniques have been disclosed regarding polymers of thiophene and thiophene derivatives having alkyl groups substituted at 3-position, they still have room for further improvement. The inventors studied the publications disclosing these techniques and concluded that when a specific radical is selected as the alkyl group for the substitution at 3-position of thiophene, there ought to be obtained a polymer of a thiophene derivative which has much better qualities than the polymers heretofore developed and is capable of extensive utility as a raw material for the production of electronic parts, for example. They continued a study based on their conclusion and perfected an invention filed on Feb. 21, 1986 under U.S. patent application Ser. No. 831,494, now U.S. Pat. No. 4,691,005. The invention of this U.S. patent application relates to poly[ 2,5-(3-ethylthienylene)] having a polymerization degree in the range of 90 to 250, a composition consisting of said poly-[2,5-(3-ethylthienylene)] and an anion dopant, and a method for the production thereof. The polymer of this invention, when produced in a polymerization degree exceeding 110, is in the form of film, possesses better moldability than the polymer produced in the form of powder, and has high practical utility.

OBJECT AND SUMMARY OF THE INVENTION

In recent years, dramatic advances made in the electric and electronic industries have created a need for materials possessing novel and outstanding electric functions. In the field of macromolecular chemistry, various materials possessing various electric properties have been developed and many of them have already been put to use. Studies are now under way in search of materials with better electric properties. Particularly, organic conductive materials which possess electric conductivity are suitable for a wide variety of parts such as, for example, electronic parts, electrodes, sensors, and photoelectric conversion elements. In the circumstances, there is desired an organic conductive material having greatly improved properties, i.e. a polymer exhibiting solubility in ordinary solvents, possessing a high degree of polymerization, and exhibiting highly satisfactory moldability.

The inventors have found that, by further improving the poly-[2,5-(3-ethylthienylene)] developed in their earlier study mentioned above, there can be obtained a novel thiophene type polymer with a high degree of polymerization which is soluble in solvents, highly moldable, capable of acquiring outstanding electric conductivity through doping, and therefore suitable as a macromolecular material for electroconductive parts and various other similar parts.

To be specific, the present invention is directed to a 3-n-alkylthiophene polymer represented by the formula:

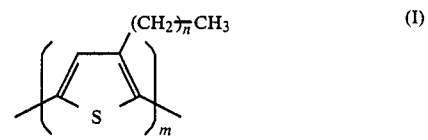

(wherein n stands for an integer in the range of 5 to 11 and m for an integer in the range of 80 to 350) and to a 3-n-alkylthiophene polymer composition obtained by doping the aforementioned polymer with an anion.

DETAILED DESCRIPTION OF THE PREFERRED EMBODIMENTS

Figure 1:
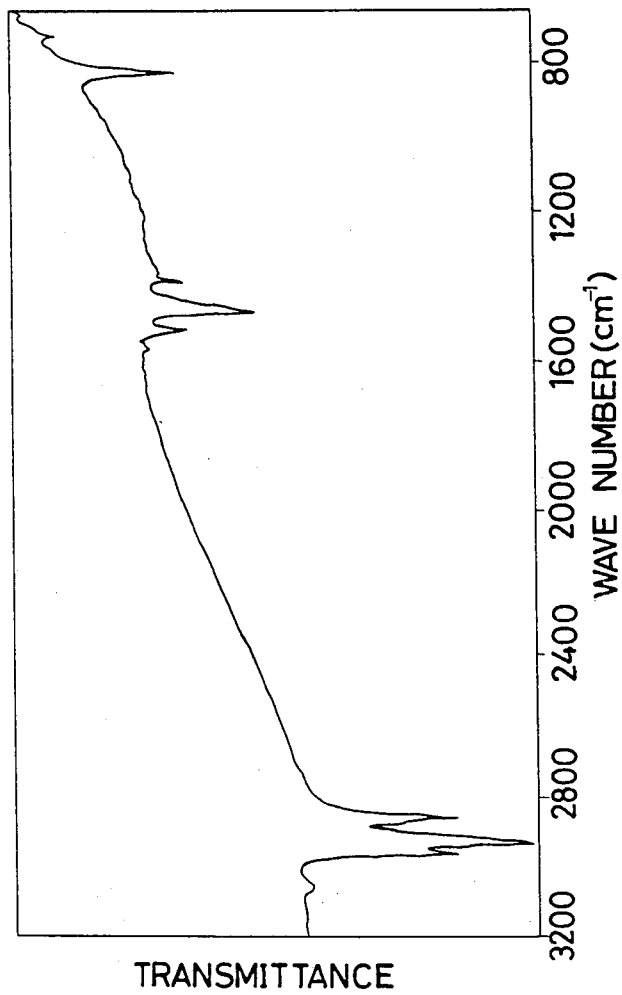
FIG. 1 is an infrared absorption spectrum of poly-[2,5-(3-hexylthienylene)] of the present invention.

The 3-n-alkylthiophene polymer of the present invention can be advantageously produced by electrolytically polymerizing a 3-n-alkylthiophene possessing a linear alkyl group of 6 to 12 carbon atoms at the 3-position thereof and represented by the following formula (II):

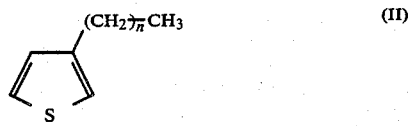

(wherein n stands for an integer in the range of 5 to 11) and subsequently electrolytically reducing the resulting polymer.

The polymer of the present invention is a novel substance not published yet in the literature. It has a polymerization degree in the range of 80 to 350 (molecular weight approximately in the range of 10,000 to 50,000) and exhibits solubility in such solvents as methylene chloride, chloroform, benzene, toluene, and tetrahydronaphthalene. Although this polymer is an electric insulator, it is converted, on being doped with such an anion as hexafluorophosphate ion, hexafluoroarsenate ion, tetrafluoroborate ion, perchlorate ion, or trifluoromethanesulfonate ion, into a conductor possessing electric conductivity sufficiently high for practical use.

The monomer to be used for the electrolytic polymerization in the present invention is a thiophene derivative which possesses a linear alkyl group of 6 to 12 carbon atoms at the 3-position as shown in the aforementioned general formula (II). As concrete examples of the alkyl group, there can be cited n-hexyl group, n-octyl group, n-nonyl group, n-decyl group, n-undecyl group, and n-dodecyl group. If the alkyl group in the monomer happens to have fewer than 6 carbon atoms, the polymer consequently obtained is sparingly soluble or totally insoluble in solvents. If the alkyl group in the monomer happens to have more than 12 carbon atoms, the polymer consequently obtained is deficient in mechanical properties and is not easily obtained in a desirable polymerization degree.

The polymer and the polymer composition of the present invention both possess a polymerization degree (m) in the range of 80 to 250. If this number m does not reach 80, the produced polymer has too low a molecular weight to form film and any film that can be produced by dissolving this polymer in a solvent and casting the resulting solution is deficient in mechanical strength. If this number m exceeds 350, the produced polymer has no solubility in solvents, and thus lacks one important characteristic of the polymer contemplated by this invention.

This number m therefore, is limited to the range of 80 to 350.

The supporting electrolyte used in the electrolytic polymerization can be any of the substances generally employed for the purpose of electrolytic polymerization. Particularly when a salt containing hexafluorophosphate ion, hexafluoroarsenate ion, tetrafluoroborate ion, perchlorate ion, or trifluoromethane-sulfonate ion is used as the supporting electrolyte, then there is obtained a polymer composition which is doped with the anion. The composition thus produced is excellent in electric conductivity.

As the electrodes to be used in the electrolytic polymerization of the present invention, electrodes formed of such noble metals as gold and platinum, those made of nickel and carbon, and glass electrodes having indic oxide and stannic oxide vacuum deposited on the surface thereof can be cited as examples. As anodes, such electrodes as are made of aluminum and mercury can be used besides those mentioned above. Now, the conditions for the electrolytic polymerization will be shown below.

(A) Solvent:
Nitrobenzene, benzonitrile, and propylene carbonate.

(B) Supporting electrolyte:
Any of the substances generally employed as supporting electrolyte for electrolytic polymerization. Preferred examples have been cited above.

(C) Concentration of the supporting electrolyte in solvent:
This concentration is in the range of 0.01 to 0.2 mol/liter. If the concentration is smaller than the lower limit, the electrolysis does not proceed smoothly. If the concentration is larger than the upper limit, the produced film has less conductivity.

(D) The concentration of the thiophene derivative of the aforementioned general formula (II) is in the range of 0.05 to 0.5 mol/liter.

(E) The electrolytic polymerization is desired to be carried out in an inert atmosphere (argon or nitrogen).

(F) Mode of electrolysis:
Constant-current electrolysis, constant-potential electrolysis, and constant-voltage electrolysis.

(G) Period of electric current passage:
This period is to be fixed in consideration of the thickness which the film of the polymer to be formed on the anode is desired to acquire.

In consequence of the electrolytic polymerization performed as described above, the polymer is doped with the anion originating in the supporting electrolyte used in the electrolytic polymerization. By using a salt containing the aforementioned anion as the supporting electrolyte, therefore, there can be obtained a conductive polymer composition which possesses highly satisfactory electric conductivity and exhibits high practical utility. This composition is soluble in such solvents as tetrahydronaphthalene and toluene and possesses desirable moldability.

Then a polymer represented by the aforementioned general formula (I) is obtained by feeding an electric current to the resulting polymer composition in reversed polarity after the electrolytic polymerization.

This polymer is soluble in such solvents as methylene chloride, chloroform, benzene, toluene, and tetrahydronaphthalene and is readily moldable. This polymer, as demonstrated in Examples 7 and 9, shows in the infrared absorption spectrum thereof an absorption at 820 $cm^{-1}$, indicating the possession of a 2,3,5-tri-substituted thiophene ring. The polymerization degree of this polymer can be determined by the use of a vapor pressure type molecular weight measuring device.

The polymer obtained by the electrolytic reduction of the polymer composition is confirmed to be represented by the formula (I) as described above. This fact shows that the polymer composition before the reduction consists or mainly consists of a 3-n-alkylthiophene polymer of the formula (I) and an anion dopant. The polymer composition acquires practical qualities when the anion content falls in the range of 1 to 30% by weight.

The polymer of this invention, i.e. a 3-n-alkylthiophene polymer represented by the general formula (I), is soluble in solvents and, therefore, can be deposited on or incorporated in materials to give rise to composites. A solution of this polymer can be deposited on a surface as by spraying and, therefore, can be used for patterning. The film obtained by the reduction of the polymer composition and the coating film produced from the solution of the polymer are both insulators having conductivity on the order of $10^{-9}$ to $10^{-12}$ S/cm. When these films are doped with an oxidizing agent such as, for example, $I_2$, $SO_3$, $AsF_5$, or $H_2SO_4$, they easily acquire conductivity exceeding $10^{-2}$ S/cm.

From the foregoing, it may be easily inferred that a printed circuit board can be produced by depositing a pattern with the solution of the polymer on a substrate and treating the deposited pattern with the oxidizing agent.

Further, the polymer composition consisting of the polymer and an anion dopant possesses outstanding electrical properties. This product exhibits electric conductivity of 50 to 110 S/cm and solubility of 60 to 90 w/w % (weight percent) in solvents. This product, therefore, can be used in masking metallic substrates during the work of patterning. The polymer composition and the polymer can be subjected alternately to oxidation and reduction. Further, as the film of the polymer and the film obtained by casting the solution of the polymer can similarly be alternately oxidized and reduced, they can be used in batteries and displays.

The polymer of the present invention and the polymer composition consisting of the polymer and an anion dopant are, therefore, highly satisfactory materials for the production of various electric parts.

Now, the present invention will be described more specifically below with reference to working examples.

EXAMPLE 1

A solution was prepared by dissolving 0.673 g (4 m.mols) of 3-n-hexylthiophene in 20 ml of nitrobenzene and adding 0.138 g (0.5 m.mol) of tetraethyl ammonium hexafluorophosphate as a supporting electrolyte to the resulting solution.

Then, in an electrolytic cell using an ITO glass electrode as an anode and a platinum plate as a cathode, the aforementioned solution was placed, argon gas was blown into the solution for 15 minutes, and then the solution was left to undergo electrolytic polymerization at 5° C. When this polymerization was carried out at a current density of 2 mA/cm² for 10 minutes, a black film-like polymer composition doped with a hexafluorophosphate ion was obtained on the anode.

This film-like polymer composition had a thickness of 7.0 μm and showed conductivity of 95 S/cm. It showed solubility of about 60% (w/w) in toluene and tetrahydronaphthalene.

EXAMPLE 2

Electrolytic polymerization of 3-n-hexylthiophene was carried out by following the procedure of Example 1, except that 20 ml of propylene carbonate was used in place of nitrobenzene and the electrolytic polymerization was carried out at a current density of 10 mA/cm² for 4 minutes. Consequently, a black film-like polymer composition doped with a hexafluorophosphate ion was obtained. This polymer composition had a thickness of 8.0 μm and showed conductivity of 110 S/cm.

EXAMPLE 3

Electrolytic polymerization was carried out by faithfully following the procedure of Example 1, except that 0.786 g (4 m.mols) of 3-n-octylthiophene was used in place of 3-n-hexylthiophene. Consequently, a black film-like polymer composition doped with a hexafluorophosphate ion was obtained. This polymer composition had a thickness of 6.0 μm and showed conductivity of 78 S/cm. It showed solubility of about 70% (w/w) in toluene and tetrahydronaphthalene.

EXAMPLE 4

Electrolytic polymerization of 3-n-octylthiophene was carried out by following the procedure of Example 3, except that 20 ml of propylene carbonate was used in place of nitrobenzene and the electrolytic polymerization was carried out at a current density of 10 mA/cm² for 4 minutes. Consequently, a black film-like polymer composition doped with a hexafluorophosphate ion was obtained.

This film-like polymer composition had a thickness of 6.8 μm and showed conductivity of 52 S/cm.

EXAMPLE 5

Electrolytic polymerization was carried out by following the procedure of Example 1, except that 1.008 g (4 m.mols) of 3-n-dodecyl thiophene was used in place of 3-n-hexylthiophene and the electrolytic polymerization was carried out at a current density of 2 mA/cm² for 5 minutes. Consequently, a black film-like polymer composition doped with a hexafluorophosphate ion was obtained on the anode.

This film-like polymer composition had a thickness of 6.9 μm and showed conductivity of 67 S/cm. It showed solubility of about 60% (w/w) in toluene and about 90% (w/w) in tetrahydronaphthalene.

EXAMPLE 6

Electrolytic polymerization of 3-n-dodecylthiophene was carried out by faithfully following the procedure of Example 5, except that 0.109 g (0.5 m.mol) of tetraethyl ammonium tetrafluorophosphate was used in place of tetraethyl ammonium hexafluorophosphate. As a result, a black film-like polymer composition doped with tetrafluorophosphate ion was obtained.

This film-like polymer composition had a thickness of 6.5 μm and showed conductivity of 61 S/cm.

EXAMPLE 7

Electrolytic polymerization of 3-n-hexylthiophene was carried out by following the procedure of Example 1, except that the electrolytic polymerization was carried out at a current density of 2 mA/cm² for 10 minutes. As a result, a black film-like polymer composition doped with a hexafluorophosphate ion was obtained on the anode.

Then, this polymer composition was subjected to electrolytic reduction by reversing the electrodes in polarity and continuing the flow of electric current at a current density of 0.5 mA/cm² until the voltage difference between the two electrodes rose past 5 V and leveled off to a constant value, to effect removal of the hexafluorophosphate ion from the composition. The resulting polymer was washed with methanol and dried, whereby there was obtained a red film-like polymer.

The infrared absorption spectrum of this polymer is shown in FIG. 1.

In the diagram, the peak at 3,060 cm$^{-1}$ is ascribable to the expansive vibration of C—H at the β position of the thiophene ring and the peaks at 3,000 to 2,800 cm$^{-1}$ are ascribable to the C—H streching vibration of the aliphatic group. The absorption at 820 cm$^{-1}$ is due to the C—H out-of-plane bending vibration characterized by the 2,3,5-tri-substituted-thiophene ring. The weak absorption at 720 cm$^{-1}$ is ascribable to the locking vibration of methylene. From the foregoing analysis of the spectrum, the polymer was identified as poly-[-2,5-(3-hexylthienylene)].

This polymer showed solubility of not less than 90% (w/w) in methylene chloride, chloroform, benzene, and tetrahydronaphthalene. The polymerization degree of this polymer, determined by means of a vapor pressure type molecular weight measuring device was 230.

EXAMPLE 8

Electrolytic polymerization of 3-n-octylthiophene was carried out by following the procedure of Example 3, to produce a black film-like polymer composition. This polymer composition was subjected to electrolytic reduction by following the procedure of Example 7. The product of this reduction was washed with methanol and then dried, whereby there was obtained a red film-like polymer.

This polymer showed solubility of not less than 90% (w/w) in methylene chloride, chloroform, benzene, and tetrahydronaphthalene. The polymerization degree of this polymer as determined with a vapor pressure type molecular weight measuring device using chloroform was 140.

EXAMPLE 9

Figure 2:
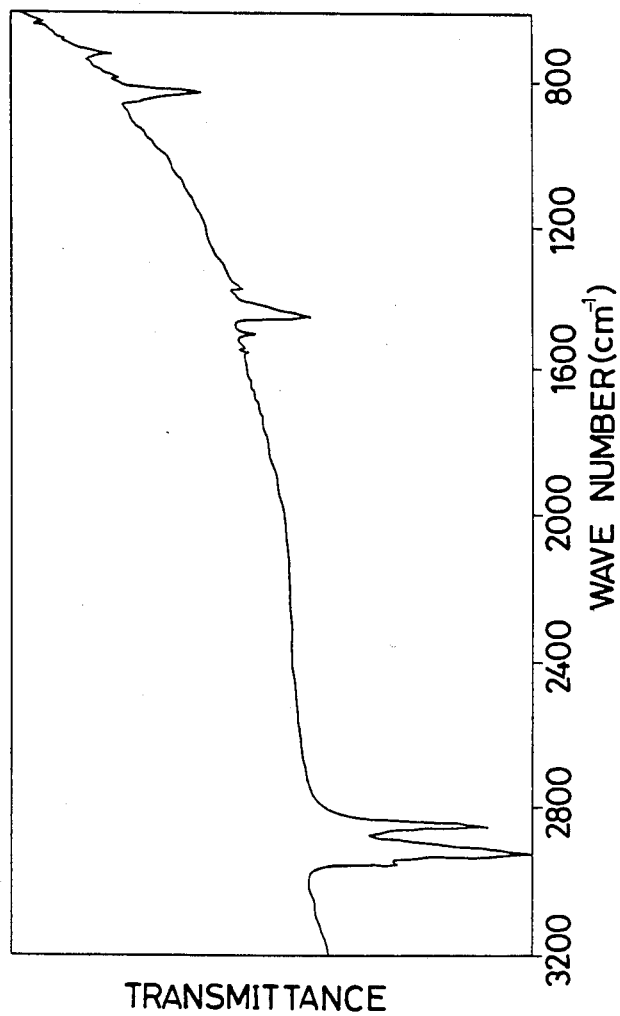
FIG. 2 is an infrared absorption spectrum of poly-[2,5-(3-dodecylthienylene)].

Electrolytic polymerization of 3-n-dodecylthiophene was carried out by following the procedure of Example 5, to produce a black film-like polymer. This polymer was subjected to electrolytic reduction by following the procedure of Example 7. When the product of this reduction was washed with methanol and dried, there was obtained a red film-like polymer. The infrared absorption spectrum of this polymer is shown in FIG. 2.

In the diagram, the peaks at 3,000 to 2,800 cm$^{-1}$ are ascribable to the C—H streching vibration of the aliphatic group and the absorption at 820 cm$^{-1}$ is ascribable to the C—H out-of-plane bending vibration characterized by the 2,3,5-tri-substituted thiophene ring. The weak absorption at 720 cm$^{-1}$ is due to the locking vibration of methylene. From the foregoing analysis of the absorption spectrum, the polymer was identified to be poly-[2,5-(3-dodecylthienylene)].

This polymer showed solubility of not less than 95% (w/w) in methylene chloride, chloroform, benzene, and tetrahydronaphthalene. The polymerization degree of this polymer as determined with a vapor pressure type molecular weight measuring device using chloroform was 90.

What is claimed is:

1. A 3-n-alkylthiophene polymer represented by the formula:

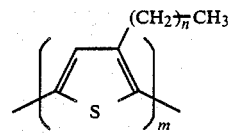

wherein n stands for an integer in the range of 5 to 11 and m for an integer in the range of 80 to 350.

2. A 3-n-alkylthiophene polymer composition consisting of a 3-n-alkylthiophene polymer of the formula:

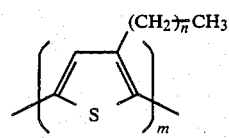

wherein n stands for an integer in the range of 5 to 11 and m for an integer in the range of 80 to 350 doped with at least one anion selected from the group consisting of hexafluorophosphate ion, hexafluoroarsenate ion, tetrafluoroborate ion, perchlorate ion, and trifluoromethanesulfonate ion.

3. The 3-n-alkylthiophene polymer composition of claim 2, wherein the content of said anion is in the range of 1 to 30% by weight.

* * * * *

UNITED STATES PATENT AND TRADEMARK OFFICE
CERTIFICATE OF CORRECTION

PATENT NO. : 4,737,557
DATED : April 12, 1988
INVENTOR(S) : Masaaki SATO, et al.

It is certified that error appears in the above-identified patent and that said Letters Patent is hereby corrected as shown below: Title page:

The following Foreign Application Priority Data should be listed:

-- Mar. 20, 1986 [JP] Japan ............... 61-62999 --

Signed and Sealed this

Twenty-third Day of August, 1988

Attest:

DONALD J. QUIGG

Attesting Officer     Commissioner of Patents and Trademarks